United States Patent Office 3,405,476
Patented Oct. 15, 1968

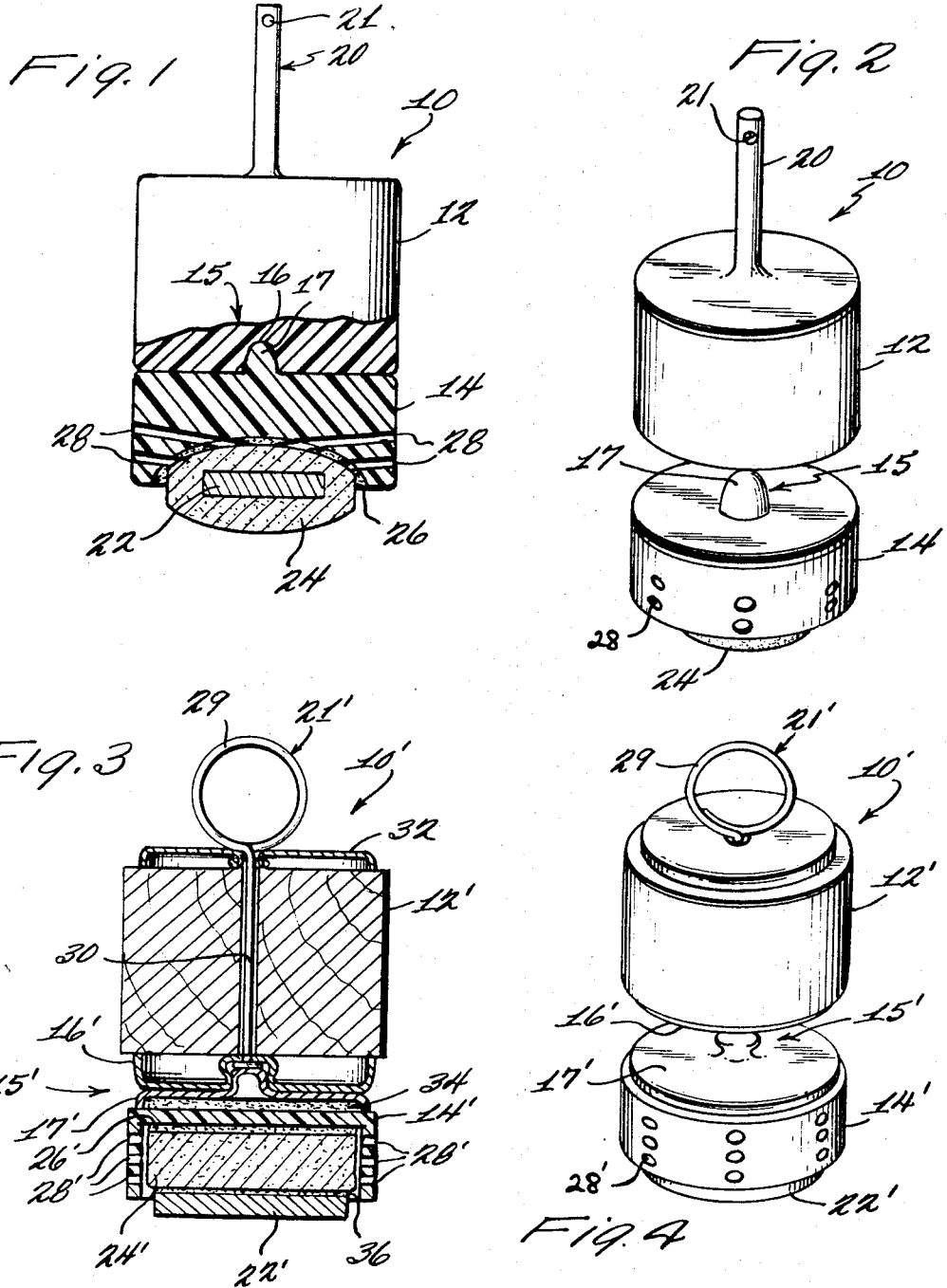

3,405,476
DISINTEGRATING SINKER
Joseph A. Pumilio, 1193 Albany St., Utica, N.Y. 13501
Filed July 29, 1966, Ser. No. 568,910
7 Claims. (Cl. 43—43.12)

This invention relates to fishing line attachments of the kind having a sinker, or weight which is automatically released from the line upon entry of the attachment into water.

It is known in the art to provide so-called disintegrating sinkers in which a small weight is released from the fishing line by means of a water-soluble coupling such as an aspirin tablet, and this broad principle is embodied in the present invention. Fishing line attachments of this general type are employed to provide a weight on the line during casting or throwing so as to carry the line by momentum. When the attachment enters the water, the coupling dissolves and releases the weight, whereupon the line floats freely so that the fisherman can feel the hook being taken by a fish.

It is the primary object of the present invention to provide a disintegrating sinker attachment for a fishing line which is constructed of two parts, one of which remains permanently with the line and the other of which carries the releasable weight and is mechanically connected to the permanent part by the fisherman.

One of the advantages of the twopart attachment is that the sinker-retaining part is readily interchangeable with sinker-retaining parts having different weights. The fisherman is therefore able to choose from a collection of retaining parts having different weights to the size weight he wishes to use and to connect it to the permanent part prior to casting. After use, the remainder of the sinker-retaining part is discarded.

Another advantage of the two-part attachment is that the part which is secured to the line may be constructed of buoyant material so as to serve as a float after the weight has been released.

The invention will be further understood from the following detailed description taken with the drawings in which:

FIGURE 1 is a side elevational view, partly broken away, of a two-part disintegrating sinker;

FIGURE 2 is a perspective view of the sinker of FIGURE 1 showing the two parts separated from each other;

FIGURE 3 is a vertical sectional view of a second form of two-part distintegrating sinker; and FIGURE 4 is a perspective view of the sinker of FIGURE 3 showing the two parts separated from each other.

Referring to FIGURES 1 and 2, there is shown a preferred form of a two-part disintegrating sinker 10 which embodies the principles of the present invention. In this construction, the two parts 12 and 14 are releasably held together by a friction type coupling 15, the elements 16, 17 of which are formed integrally with the parts 12 and 14, respectively. The coupling elements 16 and 17 may be of any conventional shape which is compatible with the technique employed for making the two parts. In the particular embodiment illustrated, both the permanent part 12 and the sinker-retainer part 14 are molded of plastic material, each part having integrally molded therewith one element of a snap-type detent coupling. Specifically, the permanent part 12 is molded in the shape of a solid cylinder having a ball-shaped cavity 16 in its lower end, and the sinker-retainer part 14 is molded in inverted cup-shaped form having a ball-shaped protrusion 17 at its upper end. Preferably the plastic material of the permanent part 12 has a density less than that of water so that the part will serve as a float when attached to a fishing line. The means for attaching the permanent part 12 to a line may take any suitable form such as a projection 20 which is integrally molded with the part and provided with an eye 21.

If the permanent part 12 is to serve as a float, the plastic material may be a solid, such as polyethylene which has a specific gravity of less than 1, or it may be a foamed plastic. Solid polyethylene of a shiny black color is very suitable from the standpoints of durability and attraction of fish.

The lower, or sinker-retaining part 14 of the attachment 10 carries a weight 22 which is automatically releasable by the action of water. Following the general teachings of the prior art, release of the weight 22 may be accomplished by a mechanism which includes a water-soluble or water-disintegrable element. In the past, various release mechanisms have been suggested which depend for their operation on the disintegration of an aspirin tablet. In the present construction, an economical and easily manufactured release mechanism includes an aspirin tablet 24 or other release tablet retained in a cavity in the lower end of the part 14 with a layer of adhesive 26, or by a press fit. The weight 22 in the form of a metal pellet is carried directly by the aspirin tablet 24 as by molding the aspirin around the tablet. Perforations 28 in the side of the part 14 assure rapid disintegration of the aspirin tablet 24 during use by permitting water to contact the upper surface of the latter.

While only one sinker-retaining part 14 is illustrated in the drawing, it is to be understood that in practice a fisherman will have a plurality of the parts 14, each of which carries its respective aspirin tablet 24 and weight 22. Preferably, the supply of parts 14 will include weights 22 of different mass so that the fisherman will be able to select the size weight which he wishes to use in each instance. To identify the different sizes of weights 22, the plastic material of the parts 14 may be of different colors or may be stamped with a code number.

FIGURES 3 and 4 illustrate a modified form of a two-part disintegrating sinker 10'. In this construction, the permanent part 12' is a small wooden cylinder, and the eye 21' and the parts of a detent coupling 15' are discrete elements. As shown, the eye 21' is constructed of a length of stiff wire bent to form an upper loop 29 and a shank 30. The shank 30 extends axially through the permanent part 12' and terminates inside the cavity of the detent half 16' of a conventional metal snap coupling of the type commonly used on women's and infants' clothing. The lower end of the shank 30 is peened or otherwise enlarged so as to hold the coupling part 16' in place on the lower end of the permanent part 12'. A thin metal disk 32 between the upper end of the part 12' and the loop 28 provides rigidity.

The sinker-retaining part 14' of the modified attachment 10' is constructed of plastic material in the form of an inverted cup. The ball-half 17' of the snap coupling 15' is secured to the upper surface of the cup 14' as with a layer of adhesive 34. A common aspirin tablet 24' is secured in the cavity of the cup 14' as by adhesive 26' and carries a small metal disk 22' on its lower surface by means of additional adhesive 36. The side wall of the cup 14' is provided with perforations 28' for the entry of water during use.

In use, the attachments 10 and 10' are employed in exactly the same manner, and a description of the use of the attachment 10 will suffice for both embodiments. Initially, the fisherman will supply himself with a plurality of sinker-retaining parts 14 for each permanent part 12. Each part 14 is, of course, a complete unit in that it includes its own weight 22, aspirin tablet 24 and coupling element 17. As previously indicated, the supply of parts 14 may include weights 22 of different sizes, each size being suitably identified for the convenience of the fisherman.

The permanent part 12 is first attached to a fishing line by threading the line through the eye 21 and tying. The fisherman then selects a sinker-retaining part 14 and couples it to the permanent part 12 by pressing the coupling elements 16 and 17 together. When his supply of parts 14 includes different sized weights 22, he will make his selection on the basis of the distance he is to cast and the weight of his line. During casting of the line, the weight 22 serves, of course, to supply momentum for carrying the line to the desired location and to cause the end portion of the line to sink into the water. As soon as the attachment 10 enters the water, the aspirin tablet 24 commences to dissolve. This releases the weight 22 within a few seconds so that it drops away from the attachment 10. The permanent part 12, being buoyant, rises to the surface and serves as a float to identify the position of the fishing line. Since the end of the line is now floating freely in the water, the fisherman can easily feel the pull of a fish which would be overshadowed if the weight 22 were still attached.

That portion of the sinker-retaining part 14 which remains after the aspirin 24 and the weight 22 have fallen away will be discarded by the fisherman before his next cast. It is necessary only to pull on the parts 12 and 14 with the fingers to release the snap coupling 15. Then the fisherman will attach a new part 14 to the permanent part 12.

What is claimed is:
1. An attachment for use with a fishing line comprising: a permanent part for attachment to a fishing line, said permanent part including a body and means for securing said body to a fishing line; a sinker-retaining part including a body adapted to support a sinker which is releasable upon entry of the attachment into water; mechanical means for releasably connecting together said permanent part and said sinker-retaining part, said connecting means including two cooperating coupling elements, one of which is carried by said permanent part and the other of which is carried by said sinker-retaining part; a weight carried by said sinker-retaining part; and water soluble release means connecting said weight to said sinker-retaining part for releasing said weight upon entry of the attachment into water.

2. An attachment as in claim 1 wherein said two coupling elements define a detent friction coupling.

3. An attachment as in claim 1 wherein the body of said permanent part is constructed of synthetic plastic material of lesser specific gravity than water.

4. An attachment as in claim 1 wherein the body of said permanent part is constructed of a material having lesser specific gravity than water and wherein said two coupling elements are defined by a cavity in one of said bodies and a projection on the other of said bodies, said cavity and projection forming a detent friction coupling.

5. An attachment as in claim 4 wherein the body of said sinker-retaining part is constructed of synthetic plastic material.

6. An attachment as in claim 4 wherein the body of said permanent part is of cylindrical shape, said means for securing said permanent part to a fishing line and one of said coupling parts being located generally on the axis of said body at opposite ends thereof, and wherein the body of said sinker retaining part is constructed in the form of an open-ended shell defining a sinker-retaining cavity, the other of said coupling parts being disposed on the exterior of said last-named body adjacent the inner end of said sinker-retaining cavity.

7. An attachment for use with a fishing line comprising: a permanent float for attachment to a fishing line, said float including a body which is buoyant in water and means for attaching said body to a fishing line; a sinker-retaining part including a body, a weight and water-soluble release means connecting said weight to the body of said sinker-retaining part for releasing said weight upon entry of said attachment into water; and mechanically-releasable connecting means connecting said float to the body of said sinker-retaining part whereby any of a plurality of similar sinker-retaining parts may be connected to said float and whereby the body of a sinker-retaining part may be removed from said float after the weight has been released by the action of water.

References Cited
UNITED STATES PATENTS

| | | | |
|---|---|---|---|
| 2,239,117 | 9/1943 | Henderson et al. | 43—43.12 |
| 2,928,202 | 3/1960 | Smerke | 43—43.12 |
| 3,102,359 | 9/1963 | Cahill et al. | 43—43.14 |

SAMUEL KOREN, *Primary Examiner.*

D. J. LEACH, *Assistant Examiner.*